US006074705A

United States Patent [19]

DeBaene

[11] Patent Number: 6,074,705

[45] Date of Patent: Jun. 13, 2000

[54] APPLICATOR AND METHOD FOR TEMPORARILY MASKING STAINS ON CLOTHING

[76] Inventor: David N. DeBaene, 60 Peters La., West Warwick, R.I. 02893

[21] Appl. No.: 09/302,670

[22] Filed: Apr. 30, 1999

Related U.S. Application Data

[62] Division of application No. 08/970,712, Nov. 14, 1997, Pat. No. 5,993,097.

[51] Int. Cl.[7] .............................. B05D 1/00; B05D 1/26; B05D 3/00; C09D 1/04; C09D 5/00

[52] U.S. Cl. .......................... 427/447; 427/453; 427/445; 106/31.01; 106/31.13; 106/31.93; 106/31.96; 106/34; 8/495

[58] Field of Search .................................... 427/447, 453, 427/445; 106/31.01, 31.13, 31.93, 31.96, 34; 8/495

[56] References Cited

U.S. PATENT DOCUMENTS

| | | | |
|---|---|---|---|
| 3,033,213 | 5/1962 | Joss et al. | 132/79 |
| 3,214,782 | 11/1965 | Masters et al. | 15/521 |
| 3,396,874 | 8/1968 | Malone | 222/402.1 |
| 3,829,224 | 8/1974 | Kloosterhouse | 401/130 |
| 3,857,727 | 12/1974 | Benisek | 117/62 |
| 4,522,523 | 6/1985 | Vogelsang | 401/126 |
| 4,600,327 | 7/1986 | Guzman | 401/18 |
| 4,654,081 | 3/1987 | Dalzell | 106/23 |
| 4,761,088 | 8/1988 | Zubek | 401/122 |
| 4,982,879 | 1/1991 | Corrado et al. | 222/400.7 |
| 5,061,517 | 10/1991 | Speer | 427/140 |
| 5,147,457 | 9/1992 | Hino et al. | 106/19 |
| 5,338,775 | 8/1994 | Matz et al. | 523/161 |

FOREIGN PATENT DOCUMENTS

| | | |
|---|---|---|
| 1 963 550 | 7/1970 | Germany . |

*Primary Examiner*—Yogendra Gupta
*Assistant Examiner*—Brian P. Mruk
*Attorney, Agent, or Firm*—Salter & Michaelson

[57] ABSTRACT

An applicator for temporarily masking stains on clothing includes a canister having an chamber for containing fluid, a water based, stain masking solution disposed within the chamber of the canister, and a brush or a spray head applying the stain masking solution from the chamber of the canister on a stain requiring masking. The stain masking solution covers the stain so that the stain is substantially concealed. The canister has an elongate annular wall having an open end at one end thereof, and an end wall closing the other end of the annular wall. Preferably, the stain masking solution consists of: resin—approximately 10.0 percent by weight; isopropanol—approximately 15.0 percent by weight; water—approximately 55.0 percent by weight; titanium dioxide—approximately 15.0 percent by weight; and ammonia—approximately 5.0 percent by weight.

13 Claims, 4 Drawing Sheets

APPLICATOR AND METHOD FOR TEMPORARILY MASKING STAINS ON CLOTHING

CROSS-REFERENCE TO RELATED APPLICATONS

This application is a division of U.S. patent application Ser. No. 08/970,712, filed Nov. 14, 1997 now U.S. Pat No. 5,993,097.

BACKGROUND OF THE INVENTION

This invention relates generally to methods and apparatuses for eliminating the sight of stains on clothing, and more particularly to a method and applicator for temporarily masking stains on clothing immediately after they are created.

When wearing clothing, especially dress shirts, dresses and the like, a frequent problem is that of staining the clothing during normal activities, such as eating or using writing implements (e.g., pens). For example, food-based stains are often difficult to rinse out since the food becomes embedded within the fabric of the cloth. Conventional remedies, such as soda water, cold water, etc., prove difficult in completely removing the stain immediately after the stain is formed. And even when the stain is substantially removed by utilizing one of the conventional remedies, a water mark surrounding the area where the stain was formed remains. Oftentimes, the only effective solution is to change the article of clothing, which can be difficult if a suitable substitute article is not readily available.

Based on the foregoing, there is presently a need for a product which temporarily covers or masks the stain until the stain can be properly removed by conventional or professional cleaning methods.

SUMMARY OF THE INVENTION

The present invention is directed to an applicator in the form of a pen for temporarily masking stains on clothing comprising a canister having an chamber for containing fluid, a water based, stain masking solution disposed within the chamber of the canister, and application means for applying the stain masking solution from the chamber of the canister on a stain requiring masking. The stain masking solution covers the stain so that it is substantially concealed.

More specifically, the canister has an elongate annular wall having an open end at one end thereof, and an end wall closing the other end of the annular wall. The arrangement is such that the annular and end walls define the chamber. Preferably, the stain masking solution consists of: resin—approximately 10.0 percent by weight; isopropanol—approximately 15.0 percent by weight; water—approximately 55.0 percent by weight; titanium dioxide—approximately 15.0 percent by weight; and ammonia—approximately 5.0 percent by weight.

In one embodiment, the application means comprises a cap member constructed for closing the open end of the annular wall and a brush member fixedly attached to the cap member. The brush member extends within the chamber of the canister when the cap member is releasably attached to the annular wall at its open end.

In another embodiment, the application means comprises a spray valve device mounted on the annular wall at the open end of the annular wall. Specifically, the spray valve device includes a housing mounted on the annular wall, the housing having an annular rim which is seated on the annular wall, a downwardly projecting cylindrical portion and an upwardly projecting cylindrical portion. The spray valve device further includes a plunger element secured to the housing, and a tube in selective fluid communication with the plunger element, the downwardly projecting cylindrical portion and the tube extending into the chamber of the canister. The plunger element is movable between a first, upper position in which the tube is blocked and a second, lower position in which the tube is in fluid communication with the chamber of the canister for dispensing the stain masking solution. A spring biases the plunger in its first, upper position.

A second aspect of the present invention is directed to a method comprising the steps of: (a) providing an applicator including a canister having an chamber for containing fluid, a water based, stain masking solution disposed within the chamber of the canister, and application means for applying the stain masking solution from the chamber of the canister on a stain requiring masking; and (b) applying a coat of the stain masking solution on a stain on clothing, said stain masking solution covering the stain so that the stain is substantially concealed.

A third aspect of the present invention is directed particularly to the stain masking solution. Specifically, as mentioned above, the stain masking solution consists of: resin—approximately 10.0 percent by weight; isopropanol—approximately 15.0 percent by weight; water—approximately 55.0 percent by weight; titanium dioxide—approximately 15.0 percent by weight; and ammonia—approximately 5.0 percent by weight.

Accordingly, among the several objects of the present invention are: the provision of an applicator for temporarily masking stains on clothing which completely conceals the stain; the provision of such an applicator having a stain masking solution with a color matching the color of the clothing being masked; the provision of such an applicator in the form of a hand held canister which is capable of applying a stain masking solution on the stain; the provision of such an applicator which embodies the form of a pen that can be conveniently carried in a dress shirt pocket, briefcase, and pocketbook; the provision of such an applicator capable of either brushing or spraying the stain masking solution on the stain; and the provision of such an applicator which is simple in construction, easy to manufacture, and easy to use.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

Figure 1:
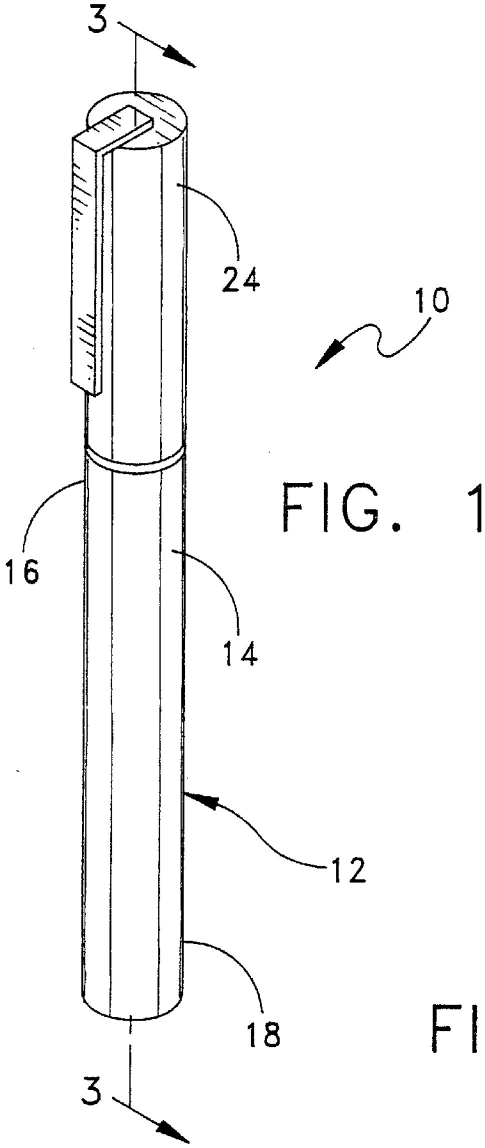
FIG. 1 is a front perspective view of an applicator of a first embodiment of the present invention for temporarily masking stains on clothing.
Figure 2:
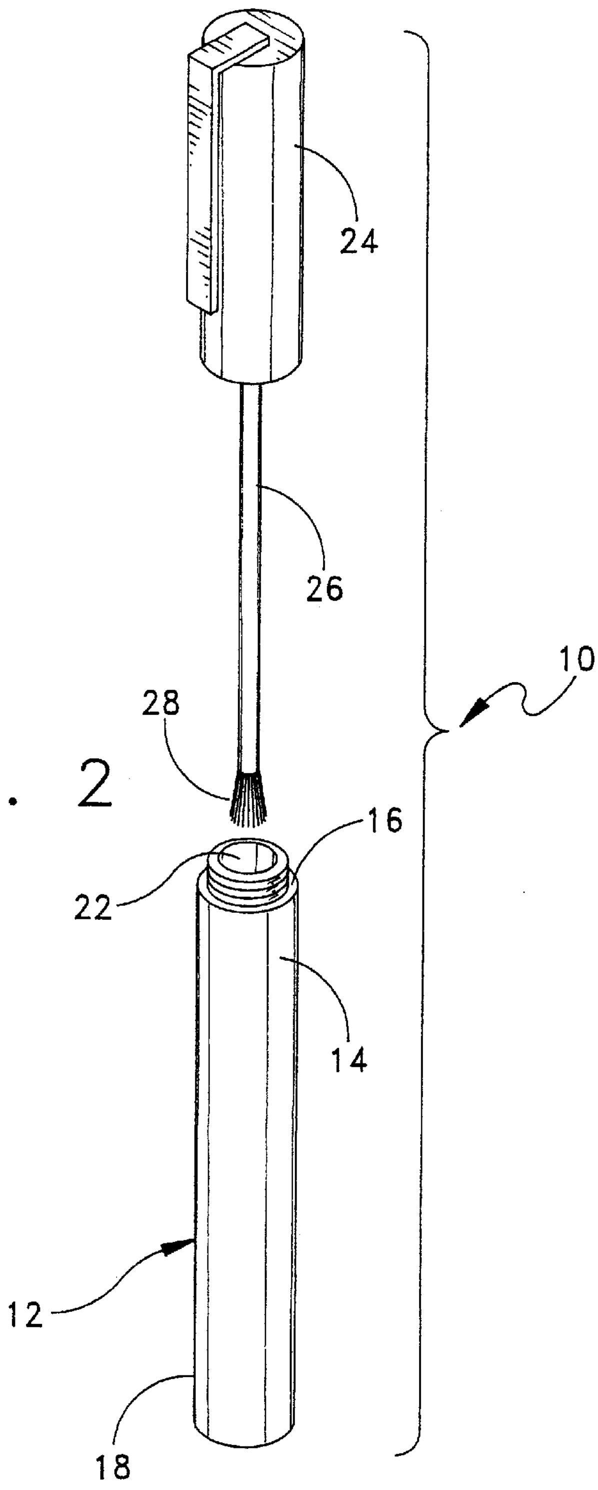
FIG. 2 is a front perspective view of the applicator illustrated in FIG. 1, the applicator having a handle portion and a canister spaced from the handle portion.
Figure 3:
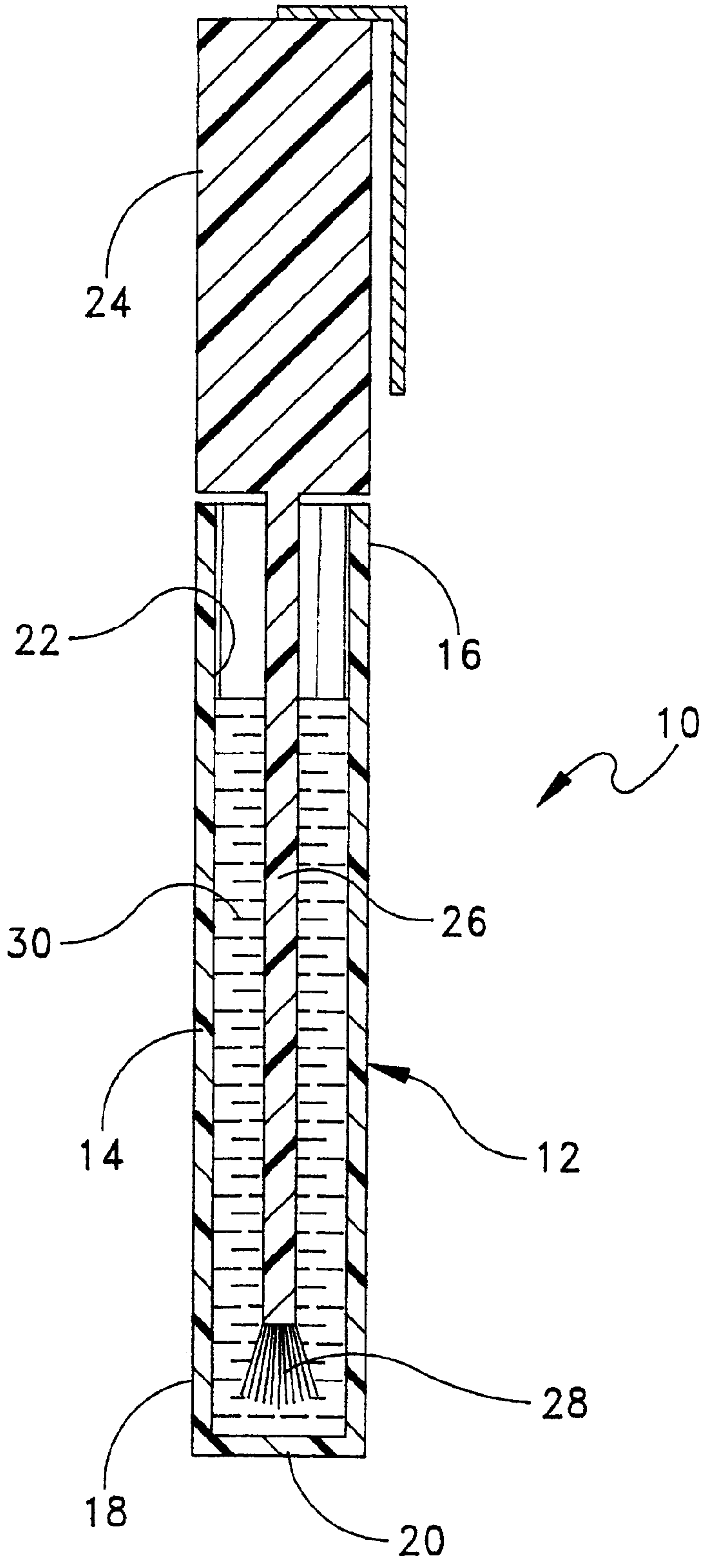
FIG. 3 is a cross-sectional view of the applicator taken along Line 3—3 of FIG. 1.

Referring now to the drawings, and more particularly to FIGS. 1–3, there is generally indicated at 10 an applicator of the present invention for temporarily masking stains on clothing (not shown). As mentioned above, it is oftentimes desirable to temporarily mask a stain so that the article having the stain, e.g., a shirt, does not have to be immediately changed. The applicator 10 of the present invention enables the wearer to temporarily mask the stain without having to change the article of clothing, or having to attempt to remove the stain by conventional methods.

The applicator 10 comprises a cylindrical canister, generally indicated at 12, having an elongate annular wall 14 with an upper open end 16. A lower end 18 of the annular wall 14 is enclosed by an end wall 20 (see FIG. 3). The annular wall 14 and the end wall 20 together define a chamber 22 which is suitable for containing fluid. The applicator 10 further comprises a cap member 24 which is constructed to close the open end 16 of the annular wall 14 of the canister 12. As shown, the cap member 24 embodies the form of a pen cap wherein a spring clip (not designated) is provided for releasably securing the cap member 24 to a shirt pocket, for example. More particularly, the cap member 24 is releasably attachable to the canister 12 by any suitable method, such as press fitting the cap member 24 on an annular flange (not shown) or by providing mating threads on the cap member 24 and the canister 12 (also not shown). In any event, the cap member 24, when attached to the annular wall 14 of the canister 12, prevents fluid contained in the chamber 22 from leaking out of the canister 12 (e.g., by means of a rubber seal).

Turning now to FIG. 3, the cap member 24 includes a downwardly projecting brush member 26 which is fixedly attached to the interior of the cap member 24. When the cap member 24 is attached to the canister 12, the brush member 26 extends within the chamber 22 of the canister 12 so that it is deposited within the fluid. This construction is similar to presently available correction fluid bottles, mascara applicators, and the like. The arrangement is such that upon removing the cap member 24 from the canister 12, bristles 28 provided at the lower end of the brush member 26 have fluid deposited thereon in the well known manner.

Preferably, the canister 12 contains a water based, stain masking solution 30 within its chamber 22 (see FIG. 3). The stain masking solution 30 can be chosen from any water based, water soluble substance suitable for covering stains. For example, one type of solution particularly effective for masking stains is:

resin—approximately 10.0 percent by weight;

isopropanol—approximately 15.0 percent by weight;

water—approximately 55.0 percent by weight;

titanium dioxide—approximately 15.0 percent by weight; and ammonia—approximately 5.0 percent by weight.

It should be noted that the pigments of the solution can chosen to match the color of the article of clothing. For example, for white dress shirts, solutions containing pigments having various shades of white are suitable.

Figure 4:
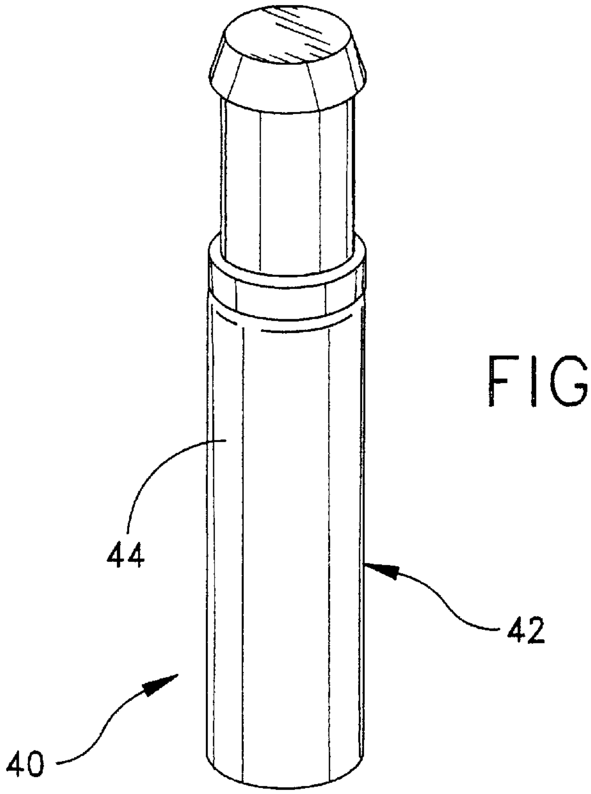
FIG. 4 is a front perspective view of an applicator of a second embodiment of the present invention.
Figure 5:
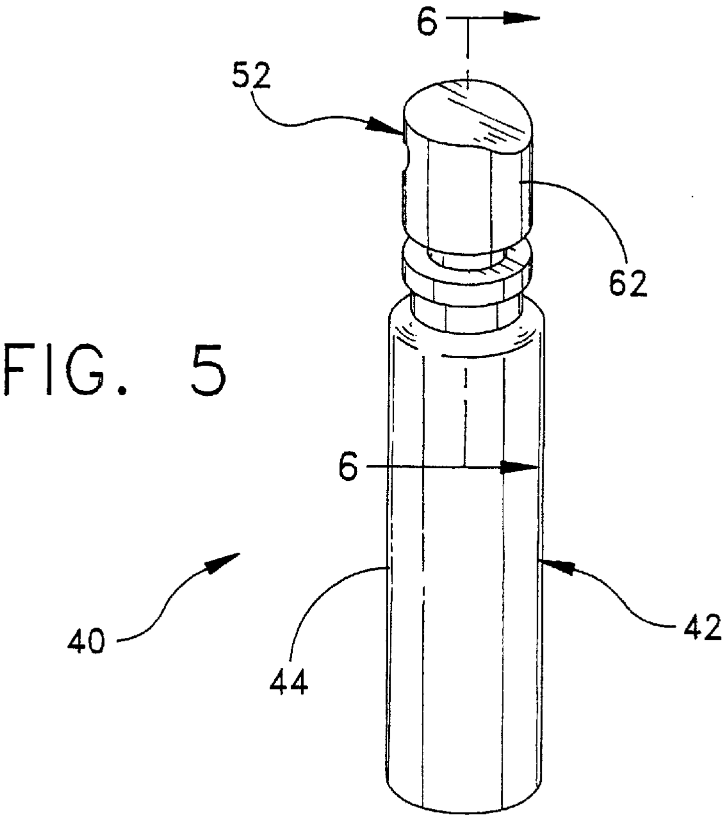
FIG. 5 is a front perspective view of the applicator illustrated in FIG. 4, the applicator having its cap removed therefrom.
Figure 6:
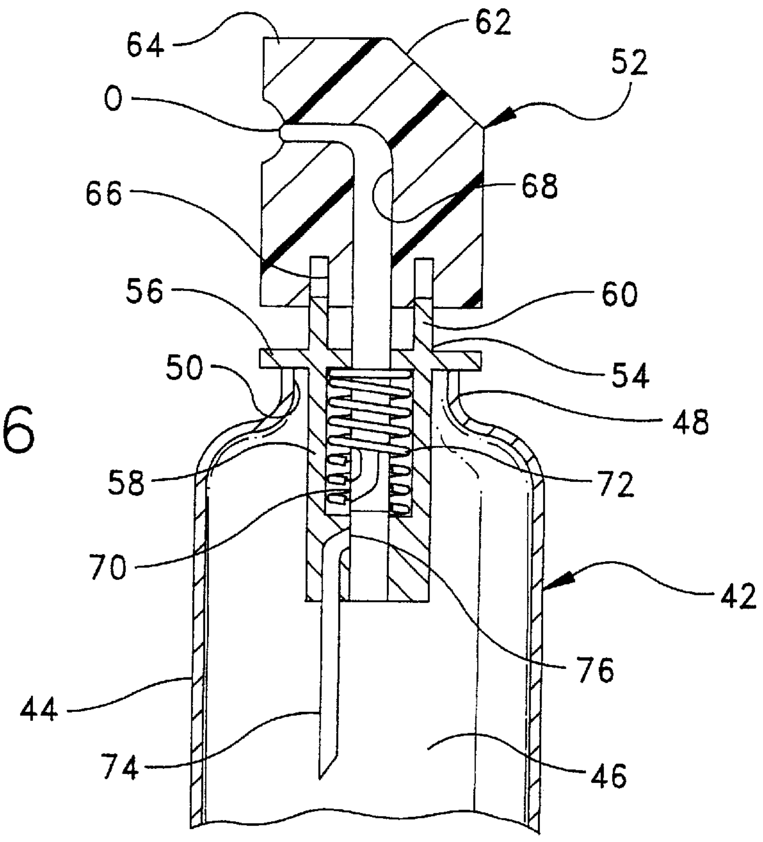
FIG. 6 is a cross-sectional view of a spray valve device of the applicator taken along Line 6—6 of FIG. 5.

Referring to FIGS. 4–6, there is generally indicated at 40 an applicator of another preferred embodiment. Applicator 40 also includes a canister, generally indicated at 42, which is constructed similarly to canister 12. Specifically, canister 42 has an annular wall 44 which defines a chamber 46, but, at its upper end, is tapered to a formation 48 comprising a vertical flange that defines an opening 50 through which fluid is received and dispensed. The applicator 40 also includes a spray valve device, generally indicated at 52, for spraying the stain masking solution onto the stain. Spraying the stain masking solution on the stain, rather than brushing it thereon, achieves a more uniform coverage and thus a better result. A cap member (not designated) covers the spray valve device 52 and is releasably securable to the canister 42.

Turning to FIG. 6, the spray valve device 52 includes a housing 54 mounted on the formation 48 of the canister 42. The housing 54 has an annular rim 56 which is seated on and sealed to the formation 48 of the canister 42, a downwardly projecting cylindrical portion 58, and an upwardly projecting cylindrical portion 60. A plunger element 62 is secured to the housing 54, and includes a body 64 having an annular recess 66 for receiving the upwardly projecting cylindrical portion 60 therein. A first tube 68 is received within an elongate cavity formed in the plunger element 62 and extends downwardly into the chamber 46 of the canister 42 within the downwardly projecting cylindrical portion 58. The upper end of the first tube 68 defines an outlet O through which the stain masking solution is dispensed. The lower end of the first tube 68 has a first port 70 formed therein, the purpose of which will become apparent below.

A spring 72 is contained within the downwardly projecting cylindrical portion 58 and attached at its upper end to the first tube 68 for biasing the tube 68 and the plunger element 62 upwardly. The downwardly projecting cylindrical portion 58 has a second tube 74 in fluid communication therewith, the second tube 74 extending downwardly to the bottom of the chamber 46 of the canister 42. The upper end of the second tube 74 terminates at its upper end to define a second port 76 within the downwardly projecting cylindrical portion 58 of the housing 54. The plunger element 62 is movable between a first, upper position in which the first port 70 of the first tube 68 is blocked and a second, lower position in which the first port 70 of the first tube 68 is in fluid communication with the second port 76 of the second tube 74 for allowing fluid to be dispensed from the spray valve device 52. In this embodiment, carbon dioxide is added to the stain masking solution for increasing the fluid pressure in the chamber 46 of the canister 42 for dispensing of the solution from the canister 42.

Figure 7:
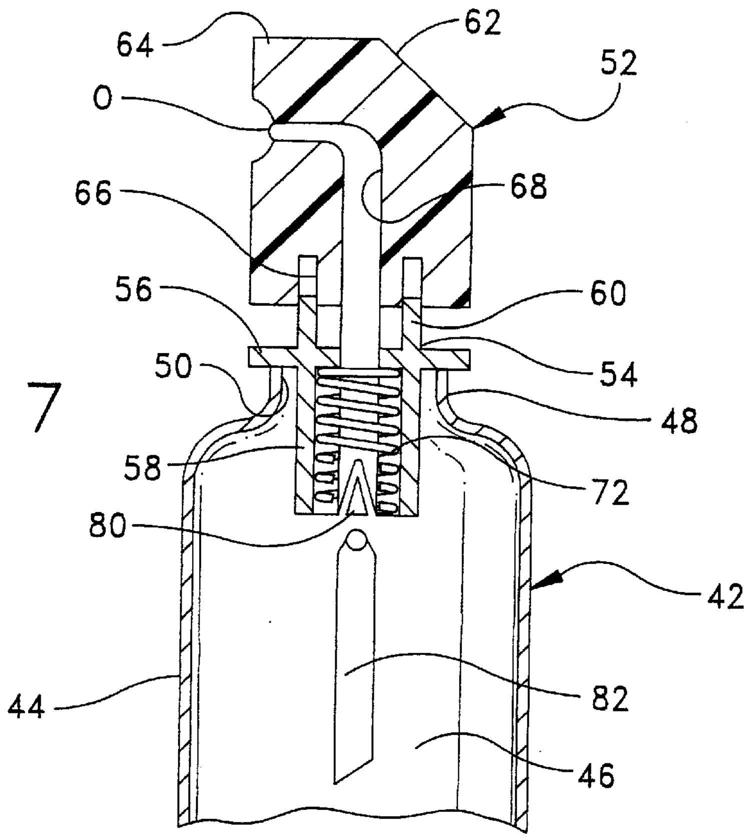
FIG. 7 is a cross-sectional view similar to FIG. 6 of another type of spray valve device.

FIG. 7 illustrates a spray valve device, generally indicated at 78, of an alternate design. As shown, the spray valve device 78 is substantially similar to spray valve device 52 wherein similar parts are designated by corresponding reference numbers. The only difference is that a needle valve 80 is provided at the lower end of the first tube 68, the needle valve 80 being engaged by a needle 82 for dispensing fluid from the spray valve device 78. With this embodiment, when the plunger element 62 is depressed thereby opening the needle valve 80, the liquid stain masking solution is forced through the needle valve 80 by virtue of the pressure differential created. Thus, carbon dioxide is not required for expelling the stain masking solution out of the chamber 46 of the canister 42.

It should be observed that the stain masking applicators 10, 40 are each suitable for temporarily masking stains on clothing. With both applicators 10, 40, a coat of the stain masking solution can be applied on a stain on clothing wherein the stain masking solution covers the stain so that the stain is substantially concealed. It should be noted that more than one coat of the stain masking solution can be applied to the stain for stains that are difficult to conceal. Since the stain masking solution is water soluble, it rinses easily out of the fibers of the clothing when cleaning the clothing. It is an important aspect of the instant invention that the stain masking solution completely wash out of the clothing and that it does not permanently stain the clothing. The solution of the contemplated invention achieves this objective while effectively covering the stain. Since a person can have several applicators having various shades of white, that person can choose a stain masking solution color which matches the color of the clothing having the stain.

Thus, it can therefore be seen that for the reasons set forth above, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method for temporarily masking stains on clothing comprising the steps of:

(a) providing an applicator including a canister having a chamber constructed and arranged to contain a temporary stain masking solution, a water based, temporary stain masking solution disposed within the chamber of the canister, and an applicator member constructed and arranged to selectively apply the temporary stain masking solution from the chamber of the canister on a stain on an article; and (b) applying a coat of the stain masking solution on the stain on the article, the stain masking solution covering the stain so that the stain is substantially concealed until such time as the stain is cleaned.

2. The method set for th in claim 1, the stain masking solution consisting of: resin, isopropanol, water, titanium dioxide, and ammonia.

3. The method set forth in claim 1, the stain masking solution consisting of:

resin—approximately 10.0 percent by weight;

isopropanol—approximately 15.0 percent by weight;

water—approximately 55.0 percent by weight;

titanium dioxide—approximately 15.0 percent by weight; and ammonia—approximately 5.0 percent by weight.

4. The method set forth in claim 1 further comprising the step of applying at least one more coat of the stain masking solution on the stain.

5. The method set forth in claim 1 further comprising the step of cleaning the article to remove the stain and the coat of stain masking solution.

6. The method set forth in claim 1, the step of providing an applicator including the step of choosing a stain masking solution color which matches the color of the article having the stain.

7. A stain masking solution consisting of: resin—approximately 10.0 percent by weight; isopropanol—approximately 15.0 percent by weight; water—approximately 55.0 percent by weight; titanium dioxide—approximately 15.0 percent by weight; and ammonia—approximately 5.0 percent by weight.

8. A method for temporarily masking stains on clothing comprising the steps of:

applying a coat of a water based, temporary stain masking solution onto a stain on an article; and covering the stain with the stain masking solution so that the stain is substantially concealed until such time as the stain is cleaned.

9. The method set forth in claim 8, said stain masking solution consisting of: resin, isopropanol, water, titanium dioxide, and ammonia.

10. The method set forth in claim 8, said stain masking solution consisting of:

resin—approximately 10.0 percent by weight;

isopropanol—approximately 15.0 percent by weight;

water—approximately 55.0 percent by weight;

titanium dioxide—approximately 15.0 percent by weight; and ammonia—approximately 5.0 percent by weight.

11. The method set forth in claim 8 further comprising the step of applying at least one more coat of the stain masking solution on the stain.

12. The method set forth in claim 8 further comprising the step of cleaning the clothing for removing the stain and the coat of stain masking solution.

13. The method set forth in claim 8 further comprising the step of choosing a stain masking solution having a color which matches the color of the article having the stain.

* * * * *